US005491623A

United States Patent [19]
Jansen

[11] Patent Number: 5,491,623
[45] Date of Patent: Feb. 13, 1996

[54] VOLTAGE MULTIPLIER USING SWITCHED CAPACITANCE TECHNIQUE

[75] Inventor: Marinus J. Jansen, Enschede, Netherlands

[73] Assignee: Fluke Corporation, Everett, Wash.

[21] Appl. No.: 311,470

[22] Filed: Sep. 23, 1994

[51] Int. Cl.[6] .................................................. H02M 7/42
[52] U.S. Cl. ............................................. 363/60; 327/536
[58] Field of Search ........................... 363/59, 60; 320/1; 307/110; 327/535, 536

[56] References Cited

U.S. PATENT DOCUMENTS

| | | | |
|---|---|---|---|
| 4,623,824 | 11/1986 | Scolari et al. | 315/241 R |
| 4,897,774 | 1/1990 | Bingham et al. | 363/61 |
| 4,994,953 | 2/1991 | Haak | 363/71 |
| 5,023,768 | 6/1991 | Collier | 363/68 |
| 5,095,223 | 3/1992 | Thomas | 307/110 |
| 5,132,895 | 7/1992 | Kase | 363/60 |
| 5,414,614 | 5/1995 | Fette et al. | 363/59 |

*Primary Examiner*—Peter S. Wong
*Assistant Examiner*—Adolf Berhane

[57] ABSTRACT

A voltage multiplier is constructed using a series combination of capacitors and an associated switching circuit which provides for charging each capacitor in the series by sequentially connecting each capacitor to a d.c. input voltage. The number of capacitors in the series combination is selectable by the user. The d.c. input voltage of N volts is converted to an a.c. output voltage of peak-to-peak N+1 times the input voltage developed off a tap in the series combination using the pattern of sequential switching. The choice of tap determines the relative offset voltage of the output waveform desired. The relative charging times of the capacitors are chosen so that the output waveform resembles a sine wave to minimize the production of harmonics.

5 Claims, 3 Drawing Sheets

VOLTAGE MULTIPLIER USING SWITCHED CAPACITANCE TECHNIQUE

BACKGROUND OF THE INVENTION

This invention relates generally to power supplies and in particular to a voltage multiplier using a series combination of capacitors sequentially charged through an associated switching circuit.

Generating high voltages from lower voltage power sources is a common design problem in electronics applications. Many applications involve the use of display technology, such as cathode my robes, electroluminescent (EL) displays, and cold cathode displays, that require voltage potentials in the hundreds or thousands of volts but at low current. A typical EL display is designed to operate with an a.c. (alternating current) voltage with a frequency of 400 hertz and 100 V rms potential but with less than 10 milliamperes of current draw for a predetermined level of brightness. EL display brightness can be adjusted by varying either the frequency or the voltage. Generating such a high voltage from the typical d.c. low voltages available for powering semiconductor components has traditionally been the function of an inverter-type power supply ("inverter"). Inverters are designed to convert a d.c. (direct current) voltage level to a different voltage level, usually a higher voltage, using active switching to convert the d.c. voltage to a pulsed voltage which in turn is applied to the primary winding of a transformer. Energy is stored in a magnetic field generated by the primary winding and a voltage is induced in the secondary winding. The secondary voltage induced depends on the turns ratio of the primary to secondary windings and the mutual coupling of the windings in a manner well known in the art. Inverters, typically simple circuits with high conversion efficiency, are available as self contained components with the input and output parameters specified so that the designer may select the particular device that best suits the application.

Inverters suffer from a disadvantage in that "noise" in the form of high frequency energy is created by the voltage conversion process. Noise from the transformer is in the form of magnetic flux which induces stray voltages in adjacent circuits. To mitigate this effect, inverter transformers are typically sheathed in ferromagnetic material to contain the magnetic flux. Furthermore, noise may also be coupled directly back into the low voltage power supply by the nature of the chopping or inverting action. When the d.c. voltage is switched, current spikes are created that require the addition of input filter circuits to filter it. If sensitive circuits are employed nearby, more elaborate filtering and isolating schemes are required to adequately isolate the noise of the inverter. Finally, the voltage and frequency of inverters are not easily varied, making the task of adjusting EL display brightness more difficult.

Passive voltage multipliers using capacitors to store energy have been employed in lieu of inverters if a true polarity reversing a.c. voltage can be obtained. Voltage multipliers have been constructed of series combinations of diodes and capacitors in a manner well known in the art. An alternating polarity sine wave signal allows the diodes, which conduct in only one polarity, to be utilized as switches for alternatively charging capacitors and then dumping the accumulated charge to other capacitors disposed in series. In this manner, a series combination of N capacitors may be charged to yield a total potential across the series combination of N times the charging voltage. The advantage of such a circuit is that the energy storage during the voltage conversion process is with capacitors which store energy as a charge rather than in a magnetic field. Such a circuit, while providing a simple method of multiplying voltage, requires an alternating polarity input voltage to operate, a limitation that makes this topology impractical in applications where only a unipolar power supply is available, such as in battery-operated portable equipment, because of the difficulty of generating an alternating polarity voltage. Furthermore, this technique yields a high voltage that is d.c., rather than the a.c. potential required for EL displays, thus requiring additional switching circuitry.

Therefore, it would be desirable to provide a voltage multiplier that has the simplicity and efficiency of the inverter-type power supply that can operate from a unipolar d.c. voltage source to provide a high voltage a.c. signal with adjustable frequency while avoiding the attendant noise problems associated with transformers.

SUMMARY OF THE INVENTION

In accordance with the present invention, a voltage multiplier circuit is provided that converts a d.c. input voltage into an a.c. output voltage which is a multiple of the input voltage. A series combination of capacitors is provided. Associated with each capacitor is a set of switches which charges each capacitor by momentarily coupling it across the input voltage and ground. The set of switches is controlled by a parallel set of control signals generated by a control circuit. Because the charging operation is sequential, meaning that adjacent capacitors are charged one after another, a periodic a.c. voltage can be generated at a tap in the series combination. The particular capacitor in the series being charged at any given moment determines the output voltage. Depending on the position of the capacitor in the series relative to the tap, the output voltage becomes the vector addition of the voltage of the capacitors in series with the input voltage or with ground. This voltage multiplier topology is readily scaleable to include more capacitors to obtain higher voltage multiplication factors. The practical limit is the reverse breakdown voltage of the diodes and switching transistors, along with the practical high voltage circuit design considerations such as corona protection. The effective capacitance of the series combination of capacitors decreases as more capacitors are added, rapidly diminishing its current sourcing ability. By selecting other taps up or down the ladder, d.c. offsets can be added to the a.c. output voltage in multiples of the d.c. input voltage.

The peak to peak a.c. output voltage generated by this topology is N+1 times the d.c. input voltage for a series combination of N capacitors. Furthermore, the switching frequency is greater than the frequency of the output signal because the voltage of all N capacitors are alternatively switched in and out of the circuit during one cycle of the output waveform. This higher switching frequency makes filtering requirements easier because smaller filter components can be used. Because there is no transformer, there is no concern about magnetic flux inducing stray voltages in nearby circuits. The shape of the output signal can be fit to any sine wave by varying the timing parameters of the control signals which govern the charging sequence. If the shape of the output signal is the best fit possible to a sine wave, the harmonic contents of the signal are minimized. The switching frequency can readily be varied, with the lower limit governed by the amount of charge storage in the capacitors and the upper limit governed by practical switching losses in the charging circuit.

One object of the present invention is to provide a voltage multiplier circuit that has improved noise performance and is more easily isolated from adjacent circuitry.

Another object of the present invention is to provide a voltage multiplier circuit which operates on d.c. voltage and provides a high voltage a.c. signal in a highly efficient manner to be compatible with the needs of battery-operated portable equipment.

An additional object of the present invention is to provide a voltage multiplier circuit with a series capacitor architecture that is readily scaleable to provide an a.c. signal with an amplitude that is a desired multiple of an input d.c. voltage.

A further object of the present invention is to provide a voltage multiplier circuit that provides a high voltage a.c. signal with a frequency that is readily adjustable without affecting the a.c. signal amplitude.

Other features, attainments, and advantages will become apparent to those skilled in the art upon a reading of the following description when taken in conjunction with the accompanying drawings.

DETAILED DESCRIPTION OF THE INVENTION

Figure 1:
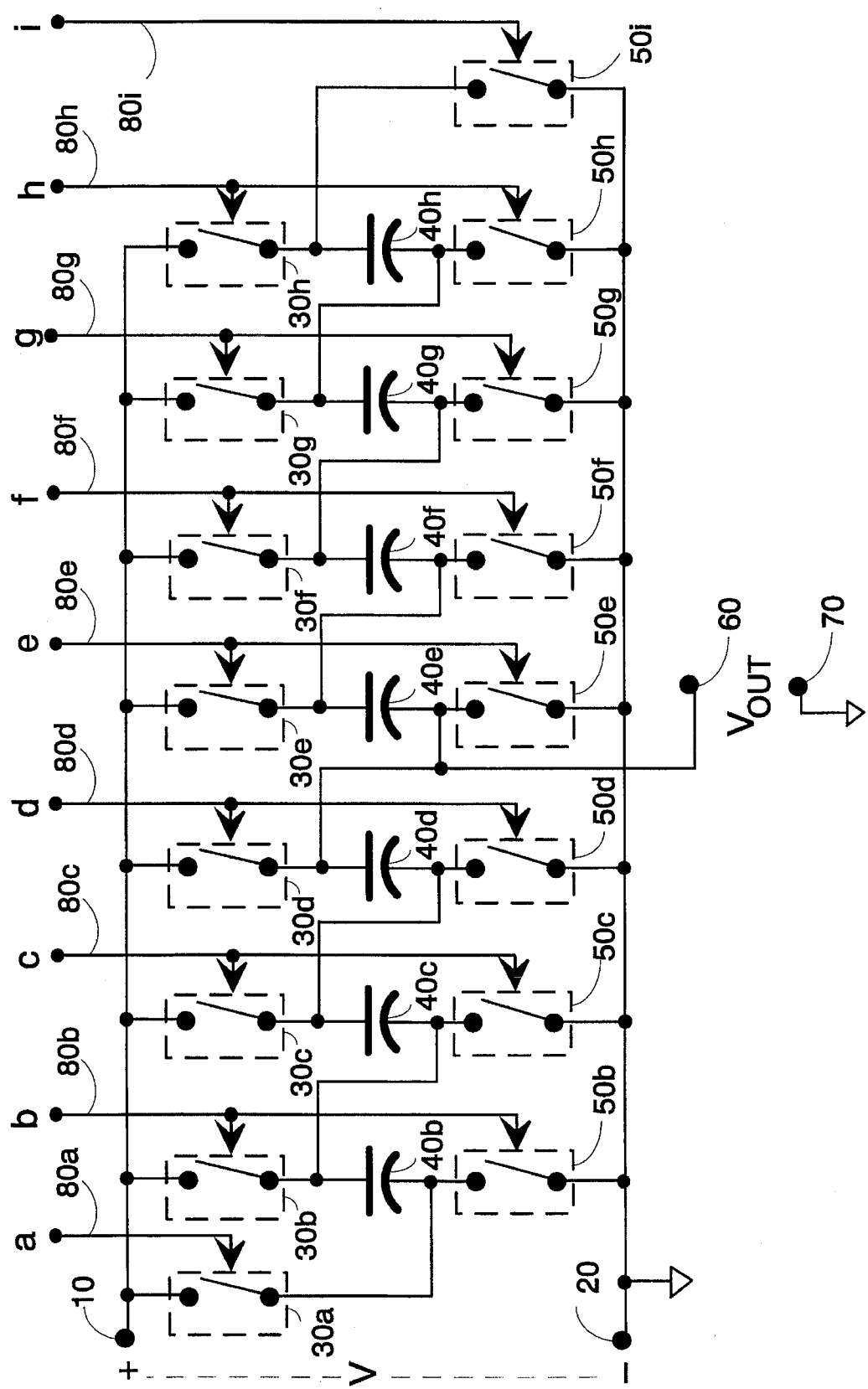
FIG. 1 is a circuit schematic diagram of a preferred embodiment of the present invention.

Referring now to FIG. 1, there is shown a schematic circuit diagram according to the present invention. A d.c. (direct current) voltage V is coupled to an input terminal 10 and an input terminal 20. A capacitor 40b, a switch 30b and a switch 50b are disposed in series with one end of the switch 30b coupled to the terminal 10 and with one end of the switch 50b coupled to the terminal 20. In a similar fashion, series combinations of switches 30c–h, capacitors 40c–h, and switches 50c–h are formed between the terminal 10 and the terminal 20. The series combination of capacitors 40b–h forms an output ladder network with taps from which the output signal Vout is developed. The output ladder network is disposed in series with a switch 30a coupled to the terminal 10 and a switch 50i coupled to the terminal 20. An output terminal 60 is coupled to a tap in the output ladder network at the connection between the capacitors 40d and 40e to receive the output signal Vout. Other taps in the output ladder network may alternatively be chosen to provide other d.c. offsets to the output signal Vout. Vout is developed across the terminal 60 and a terminal 70. The terminal 70 and the terminal 20 are both coupled to ground as shown for a common ground configuration. Alternatively, the input terminal 20 may be kept floating, with terminal 10 coupled to a positive polarity d.c. input voltage and terminal 20 coupled to a separate negative polarity d.c. input voltage in order to create a larger total input voltage V between terminals 10 and 20.

The switches 30a–h and 50b–i are actuated responsive to a set of parallel control signals received via control lines 80a–i. Switches 30b and 50b, for example, each receive the identical control signal from the control line 80b and actuate simultaneously. Similarly, switches 30c–h and 50c–h actuate responsive to control signals received via the respective control lines 80c–h. Switches 30a and 50i actuate responsive to control signals received via the control line 80a and 80i respectively.

Figure 2A:
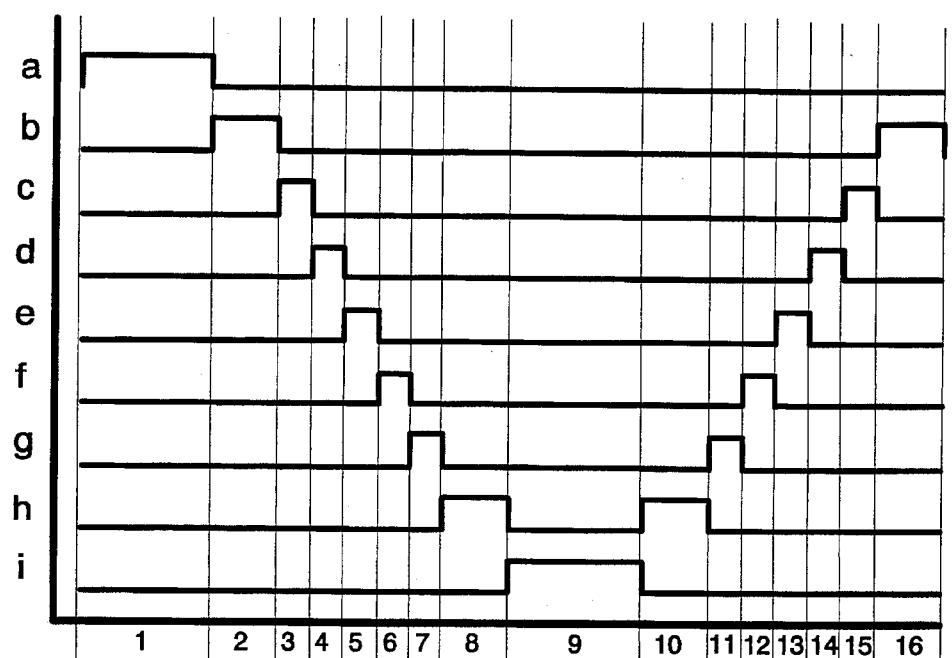
FIG. 2A–B is a timing diagram illustrating the liming signals and the resultant output signal.
Figure 2B:
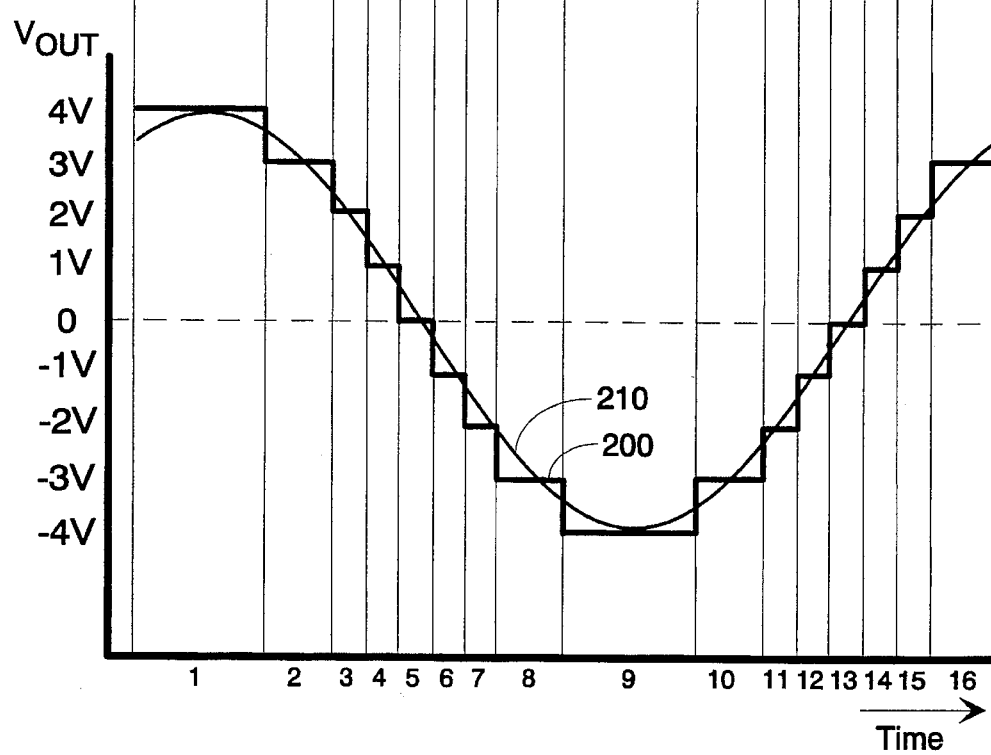

FIG. 2A–B further illustrates the operation of the present invention with several timing diagrams. The horizontal axis of both graphs shows an identical time scale while the vertical axis for the upper graph of FIG. 2A shows the voltage level of the control signals present on the control lines 80a–i and the vertical axis for the lower graph of FIG. 2B shows the voltage level Vout present at the output terminal 60. A single period of an output waveform 200 is illustrated and the waveform is repetitively produced to produce the output signal.

Looking now at the upper graph, of FIG. 2A the parallel system of control signals a–i is shown. The control signals are digital in that a predetermined logical high voltage level and logical low voltage are provided for each control signal. The upper graph should be interpreted in the manner of a conventional timing diagram which focuses on the relationship of timing events, defined as transitions of logical states, between the parallel signals. In the following explanation, it is assumed that the capacitors 40b–h have reached their fully charged voltage level V which is the steady-state operating condition of the circuit. The switches 30a–h and 50b–i actuate responsive to control signal level with logical high being closed and logical low being open.

At time 1, switch 30a coupled to control line 80a receives the control signal a which is logical high. The switch 30a actuates closed responsive to the control signal a. The other switches 30b–h and 50b–h are all open responsive to control signals b–i which are logical low. The capacitors 40b–d, all charged to the voltage V, are now coupled in series with the voltage V present a terminal 10, which creates the output voltage Vout which equals 4*V by vector addition, with the voltage level as shown in the lower diagram.

At time 2, switch 30b and switch 50b, both coupled to control line 80b each actuate closed responsive to the control signal b which is logical high. The other switches 30a and 30c–h and 50c–i are all actuated open responsive to control signals a and c–i respectively which are all logical low. The time period b is the charging time for the capacitor 40b which is coupled across the terminal 10 and 20 and charges up to the voltage V. Capacitors 40b–h are all of a capacitance value sufficiently large to substantially maintain the voltage level V through the entire period shown in the diagram from time period 1 to 16. Furthermore, the capacitors 40c and 40d, both charged to the voltage V, are now coupled in series with voltage V present at terminal 10, which creates the voltage Vout which equals 3*V by vector addition, with the voltage level as shown in the lower graph of FIG. 2B.

In a similar fashion over the remaining time periods 3–16, the voltage Vout is generated to produce the waveform as shown in the lower diagram which has a peak-to-peak voltage of N+1 times the input voltage V using a series combination of N capacitors. In the preferred embodiment, seven capacitors produce an peak-to-peak output voltage which is 8*V over the entire period. An entire period of the output waveform consists of the 16 time periods, with the sequence labeled 1–16 and mapping uniquely to opening and closing of the switches 30a–h and 50b–i in the charging sequence. This charging sequence by switch over the period is a-b-c-d-e-f-g-h-i-h-g-f-e-d-c-b which means that each capacitor is charged sequentially and the charging sequence ripples from one end of the series chain to the other and back again to form the complete period. It will be obvious that this circuit architecture may be shortened or lengthened to achieve the desired voltage multiplication ratio. To improve the noise performance of the circuit, the length of the charging periods was varied as shown in the upper diagram in order to form the output waveform produced in the lower graph to most closely approximate a sine wave using a curve fitting technique. The output waveform is shown superimposed on an ideal sine wave 210 to illustrate the actual curve fit which is limited by the amplitude resolution of nine available voltage levels and time resolution of sixteen charging periods to provide a minimum amount of harmonic content on the output signal. Increasing the number of capacitors in the series would provide for increased amplitude and time resolution to more closely approximate the sine wave as well as increasing the switching frequency even further, with attendant improvement in the noise performance.

The switching noise thus produced occurs at a frequency which is proportional to the inverse of the switching time periods. Since the longest charging periods (periods a and i) are only a small part of the total period, the lowest frequency switching noise has a frequency that is substantially higher than the frequency of the output waveform. If the charging periods a–i differ in length, the switching noise associated with each period will have a different frequency, thus spreading the noise over the frequency spectrum, which results in lower peak noise values. On the other hand, if the charging periods a–i were kept substantially equal, the output waveform thereby produced would more closely resemble a triangle waveform which produces harmonic energy at all multiples of the output waveform frequency. In the preferred embodiment, the waveform period is divided into the sixteen time periods, with harmonic energy resulting from the charge switching occurring at frequencies higher than the waveform frequency. The high frequency noise produced by the switching action is more easily filtered than noise produced at the waveform frequency because the incremental amount of current drawn by the circuit per switch operation is substantially smaller than prior art inverters using transformers in which the switch occurs once per period.

Figure 3:
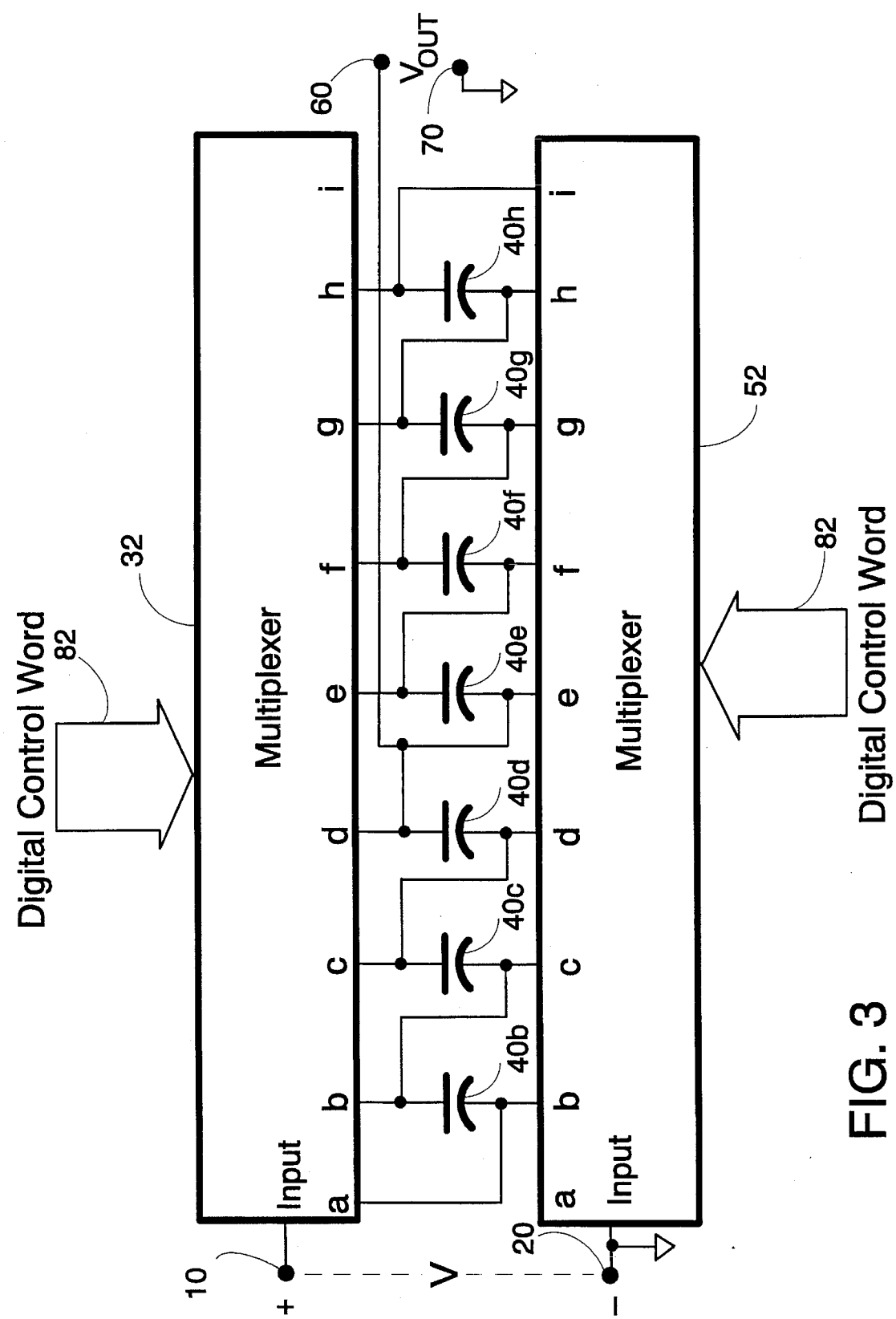
FIG. 3 is a circuit schematic diagram of an alternative embodiment of the present invention.

Referring now to FIG. 3, there is shown an alternative embodiment of the present invention. A d.c. voltage V is coupled to an input terminal 10 and an input terminal 20. The terminal 10 is coupled to an input to a multiplexer 32 which selectably couples the input to one of nine outputs labeled a–i responsive to digital control words received via a digital data bus 82 coupled to the multiplexer 32. The terminal 20 is coupled to an input to a multiplexer 52 which selectably couples the input to one of nine outputs labeled a–i responsive to digital control words received via the digital data bus 82 coupled to the multiplexer 52. Capacitors 40b–h are coupled between the outputs a–h respectively of the multiplexer 32 and the output b–i respectively of the multiplexer 52. The series combination of capacitors 40b–h forms an output ladder network with taps from which the output signal Vout is developed. The output ladder network is disposed in series between the output a of multiplexer 32 and the output i of the multiplexer 52. An output terminal 60 is coupled to a tap of the output ladder network at the connection between the capacitors 40d and 40e to receive the output signal Vout. Other taps in the output ladder network may alternatively be chosen to provide other d.c. offsets to the output signal Vout. Vout is developed across the terminal 60 and a terminal 70. The terminal 70 and the terminal 20 are both coupled to ground as shown for a common ground configuration. Alteratively, the input terminal 10 may be coupled to a positive polarity d.c. input voltage and terminal 20 coupled to a separate negative polarity d.c. input voltage in order to create a larger total input voltage V between terminals 10 and 20.

The overall operation of the alternative embodiment of the present invention is nearly identical with that of the preferred invention. The relevant difference is that the discrete switches 30a–h and 50b–i requiring a set of parallel control signals a–i are replaced with two multiplexers coupled to a digital control bus 82 to receive digital control words. The multiplexers 32 and 52 contain internal circuitry to decode the digital control words and actuate internal switches in a manner substantially the same as the preferred embodiment, but with greatly reduced component count.

Referring now to the timing diagram of FIG. 2, at time 1, multiplexer 32 couples the input to output a responsive to the control word received. The capacitors 40b–d, all charged to the voltage V, are now coupled in series with the voltage V present a terminal 10, which creates the output voltage Vout which equals 4*V as shown in the lower diagram. At time 2, the multiplexer 32 couples the input to output b and the multiplexer 52 couples the input to output b. During this time, capacitor 40b is coupled across the terminal 10 and 20 and charges up to the voltage V. Capacitors 40b–h are of a capacitance value sufficiently large to substantially maintain the voltage level V through the entire cycle shown in the diagram from time period 1 to 16. Furthermore, the capacitors 40c and 40d, both charged to the voltage V, are now coupled in series with voltage present V present at terminal 10, which creates the voltage Vout which equals 3*V as shown in the lower diagram. In a similar fashion over the remaining time periods 3–16, the voltage Vout is generated to produce the waveform as shown in the lower diagram which has a peak-to-peak voltage of N+1 times the input voltage V using a series combination of N capacitors as in the preferred embodiment. A complete period of the output waveform consists of the 16 step charging sequence corresponding to the control lines a–i of a-b-c-d-e-f-g-h-i-h-g-f-e-d-c-b which means that each capacitor is charged sequentially and the charging sequence ripples from one end of the series chain to the other and back again for a complete cycle.

It will be obvious to those having ordinary skill in the art that many changes may be made in the details of the above described preferred embodiments of the invention without departing from the spirit of the invention in its broader aspects. For example, the architecture of the present invention is readily extendible to include more capacitors in series to increase the desired input to output voltage ratio. The relative lengths and the sequence of the charging periods may be varied in other ways to create other waveshapes, with the constraint that at least one charging period for each capacitor in the series must be included for each period of the output waveform. The switches may be implemented by other types of switches, such as field effect transistors or electromechanical switches, depending on the requirements for switching speed, power handling capability, and voltage isolation. Therefore, the scope of the present invention should be determined by the following claims.

What I claim as my invention is:

1. A voltage multiplier comprising:

(a) a plurality of capacitors disposed in an output ladder network having at least one tap, each capacitor having a sufficient amount of capacitance to substantially maintain a charge voltage over a period of an alternating current output waveform;

(b) a plurality of switches for selectably coupling each of said capacitors to an input voltage for a selected charging time wherein each of said capacitors is charged at least once during said period; and (c) an output terminal coupled to said tap in said output ladder network to form said alternating current output waveform.

2. A voltage multiplier of claim 1 wherein said alternating current output waveform substantially approximates a sine wave by varying the length of said charging times.

3. A voltage multiplier of claim 1 wherein said input voltage is a d.c. voltage.

4. A voltage multiplier of claim 1 wherein each of said capacitors in said output ladder network is charged sequentially.

5. A voltage multiplier for multiplying a d.c. voltage to obtain an alternating current output waveform, comprising:

(a) a plurality of capacitors disposed in an output ladder network having at least one tap, each capacitor having a sufficient amount of capacitance to substantially maintain a charge voltage over a period of said alternating current output waveform;

(b) a plurality of switches for selectably coupling each of said capacitors to said d.c. voltage for a selected charging time wherein each of said capacitors is charged sequentially over said period; and (c) an output terminal coupled to said tap in said output ladder network of capacitors to form said alternating current output waveform wherein said alternating current output waveform substantially approximates a sine wave by varying the length of said charging times.

* * * * *